United States Patent
Glaser et al.

(10) Patent No.: US 6,681,196 B2
(45) Date of Patent: Jan. 20, 2004

(54) METHOD AND DEVICE FOR DETERMINING THE ABSOLUTE ANGLE OF ROTATION OF AN OBJECT THAT IS ROTATING ABOUT AN APPROXIMATELY HORIZONTAL ROTATIONAL AXIS

(75) Inventors: Telmo Glaser, Regensburg (DE); Florian Wolf, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/174,103

(22) Filed: Jun. 17, 2002

(65) Prior Publication Data

US 2002/0183962 A1 Dec. 5, 2002

Related U.S. Application Data

(63) Continuation of application No. PCT/DE99/04012, filed on Dec. 16, 1999.

(51) Int. Cl.[7] .......................... G06F 13/14; G01P 21/00; B60R 21/01
(52) U.S. Cl. .......................... 702/151; 701/45; 701/46; 701/110; 340/440; 180/282
(58) Field of Search ........................... 702/151; 701/45, 701/46, 47, 110, 35, 36, 38; 180/282; 280/756; 340/429, 440; 73/504.3

(56) References Cited

U.S. PATENT DOCUMENTS 5,610,575 A   3/1997   Gioutsos 6,315,074 B1 * 11/2001 Achhammer et al. ....... 180/282
6,424,897 B1 *  7/2002 Mattes et al. ................ 701/45
6,496,759 B1 * 12/2002 Mattes et al. ................ 701/1
6,542,792 B2 *  4/2003 Schubert et al. ............. 701/1

FOREIGN PATENT DOCUMENTS

| EP | 0 430 813 A1 |   | 6/1991 |
| EP | 0 934 855 A1 |   | 8/1999 |
| WO | WO 99/17962  |   | 4/1999 |
| WO | WO 01/60663  | * | 8/2001 |
| WO | WO 03/026933 | * | 4/2003 |

* cited by examiner

Primary Examiner—Kamini Shah
(74) Attorney, Agent, or Firm—Laurence A. Greenberg; Werner H. Stemer; Gregory L. Mayback

(57) ABSTRACT

A method for determining an absolute rotational angle of an object that is rotating about an approximately horizontal rotational axis, includes steps of: determining a change in a rotational angle of the object occurring during a time interval; determining an acceleration component acting in a direction of a vertical axis of the object; determining a change, occurring during the time interval, in the acceleration component acting in the direction of the vertical axis of the object; and calculating the absolute rotational angle of the object from the change in the rotational angle and the change in the acceleration component acting in the direction of the vertical axis of the object. A device constructed to perform the method does not necessarily require expensive, high-stability acceleration sensors. Sensors of a simple design can be used instead.

9 Claims, 3 Drawing Sheets

METHOD AND DEVICE FOR DETERMINING THE ABSOLUTE ANGLE OF ROTATION OF AN OBJECT THAT IS ROTATING ABOUT AN APPROXIMATELY HORIZONTAL ROTATIONAL AXIS

CROSS-REFERENCE TO RELATED APPLICATION

This application is a continuation of copending International Application No. PCT/DE99/04012, filed Dec. 16, 1999, which designated the United States and was not published in English.

BACKGROUND OF THE INVENTION

Field of the Invention

The invention relates to a method and a device for determining the absolute angle of rotation of an object that is rotating about an approximately horizontal rotational axis, in particular a motor vehicle rotating about its longitudinal axis.

In modern occupant protection systems for motor vehicles, the task arises, in the event of a rollover about the longitudinal axis, of detecting the absolute angle of rotation of the vehicle in order to be able to correctly time a decision to fire a restraining device or other protection devices.

Issued European Patent No. EP 0 430 813 B1 discloses a safety system for motor vehicles that operates with four sensors. A rate of rotation sensor detects the angular velocity of the rotation of the vehicle about its longitudinal axis. Three acceleration sensors detect the longitudinal acceleration, the transverse acceleration, and the vertical acceleration of the vehicle. The output signal of the rate of rotation sensor is integrated, and if it is above a threshold value, is fed to an OR element so that a pyrotechnic firing device is tripped. The integration of the output signal from the rate of rotation sensor is not performed continuously, but only during a time window that is determined by the output signals from the acceleration sensors.

Published European Patent Application EP 0 934 855 A1 discloses a method and a device for tripping a rollover protection device in which longitudinal, lateral, and vertical vehicle accelerations as well as rollover and pitching rates—supplied by corresponding sensors—are subjected to time averaging. The time-averaged signals are subjected to an expanded Kalman filter. Output variables of the Kalman filter is the current rollover angle and the current pitch angle of the vehicle. All five input variables must be fully utilized in order to calculate each of these variables.

SUMMARY OF THE INVENTION

It is accordingly an object of the invention to provide a method and a device for determining the absolute angle of rotation of an object that is rotating about an approximately horizontal rotational axis, in particular a motor vehicle rotating about its longitudinal axis. Using the method and the device it is possible to determine the absolute angle of rotation quickly and accurately in conjunction with simple executability and simple design.

With the foregoing and other objects in view there is provided, in accordance with the invention, a method for determining an absolute rotational angle of an object that is rotating about an approximately horizontal rotational axis. The method includes steps of: determining a change in a rotational angle of the object occurring during a time interval; determining an acceleration component acting in a direction of a vertical axis of the object; determining a change, occurring during the time interval, in the acceleration component acting in the direction of the vertical axis of the object; and calculating the absolute rotational angle of the object from the change in the rotational angle and the change in the acceleration component acting in the direction of the vertical axis of the object.

In accordance with an added mode of the invention, the object is a motor vehicle rotating about a longitudinal axis thereof.

In accordance with an additional mode of the invention, the method includes: calculating the absolute rotational angle using the following formula:

$$\alpha = (m)(\Delta a_z - \Delta a_z^0),$$

where $\alpha$ is the absolute rotational angle, and
where $m = C3/\Delta\alpha$, $\Delta a_z^0 = 1 - \cos(\Delta\alpha)$, C3 is a constant, $\Delta\alpha$ is the change in the rotational angle, and $\Delta a_z$ is the change in the acceleration component.

With the foregoing and other objects in view there is provided, in accordance with the invention, a device for determining an absolute angle of rotation of an object that is rotating about an approximately horizontal rotational axis. The device includes: a rate of rotation sensor for detecting an angular velocity of the object rotating about the rotational axis; an integrator for integrating the angular velocity and for determining a change in an angle of rotation; an acceleration sensor for detecting an acceleration component acting in a direction of a vertical axis of the object; a difference element for determining a change, accompanying the change in the angle of rotation, in the acceleration component acting in the direction of the vertical axis; and an arithmetic unit for calculating the absolute angle of rotation of the object from the change in the angle of rotation and the change in the acceleration component.

In accordance with an added feature of the invention, there is provided a high-pass filter configured between the rate of rotation sensor and the integrator.

In accordance with an additional feature of the invention, there is provided a high-pass filter configured between the acceleration sensor and the difference element.

In accordance with another feature of the invention, the arithmetic unit operates using the following formula:

$$\alpha = (m)(\Delta a_z - \Delta a_z^0),$$

where $\alpha$ is the absolute rotational angle, and
where $m = C3/\Delta\alpha$, $\Delta a_z^0 = 1 - \cos(\Delta\alpha)$, C3 is a constant, $\Delta\alpha$ is the change in the rotational angle, and $\Delta a_z$ is the change in the acceleration component.

In accordance with a further feature of the invention, the arithmetic unit is programmed to perform the following steps:
A) detect $\omega(t)$ and $a_z(t)$, where t=time, $\omega(t)$ is the angular velocity, and $a_z(t)$ is the acceleration component;
B) determine $$\Delta\alpha(T) = \int_0^T \omega(t)\,dt,$$

where T=a time interval, and calculate $\Delta a_z = a_z(T) - a_z(0)$;
C1) if $\Delta\alpha < C1$, where C1 is a constant, then proceed to step A),
C2) if $\Delta a_z > C2$, where C2 is a constant, then proceed to step A; and
D) calculate:

$\alpha = m \cdot (\Delta a_z - \Delta a_z^0)$, where $m = C3/\Delta\alpha$, $\Delta a_z^0 = 1 - \cos(\Delta\alpha)$ and C3 is a constant.

According to the invention, the change, caused by gravity, in the acceleration in the direction of the vertical axis of the vehicle, and the angle by which the vehicle rotates around its longitudinal axis are determined within a time interval. The two items of information can be used to calculate the absolute angle of rotation of the vehicle, that is to say its absolute rotary position. Because only differences of signals are considered, absolute sensor values are not necessary, and so no expensive, high-stability acceleration sensors need to be used. Instead, sensors of simple design can be used.

The invention can advantageously be applied wherever the aim is to determine the absolute angular position of an object that is rotating, in a gravity field, around a rotational axis inclined to the direction of gravity. The invention takes advantage of the fact that the gravity component or acceleration component changes in accordance with a sinusoidal or cosinusoidal function in the direction of an axis that is fixed in the object and that is rotating relative to the direction of gravity during the rotation, so that it is possible from the change in the gravity component and in the angle of rotation of the object to reach a conclusion on the absolute angle of rotation and the rotary position of the latter in a fixed coordinate system. The invention is particularly suitable for use in motor vehicles for the purpose of expediently tripping safety devices that protect against the consequences of a rollover.

Other features which are considered as characteristic for the invention are set forth in the appended claims.

Although the invention is illustrated and described herein as embodied in a method and device for determining the absolute angle of rotation of an object that is rotating about an approximately horizontal rotational axis, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
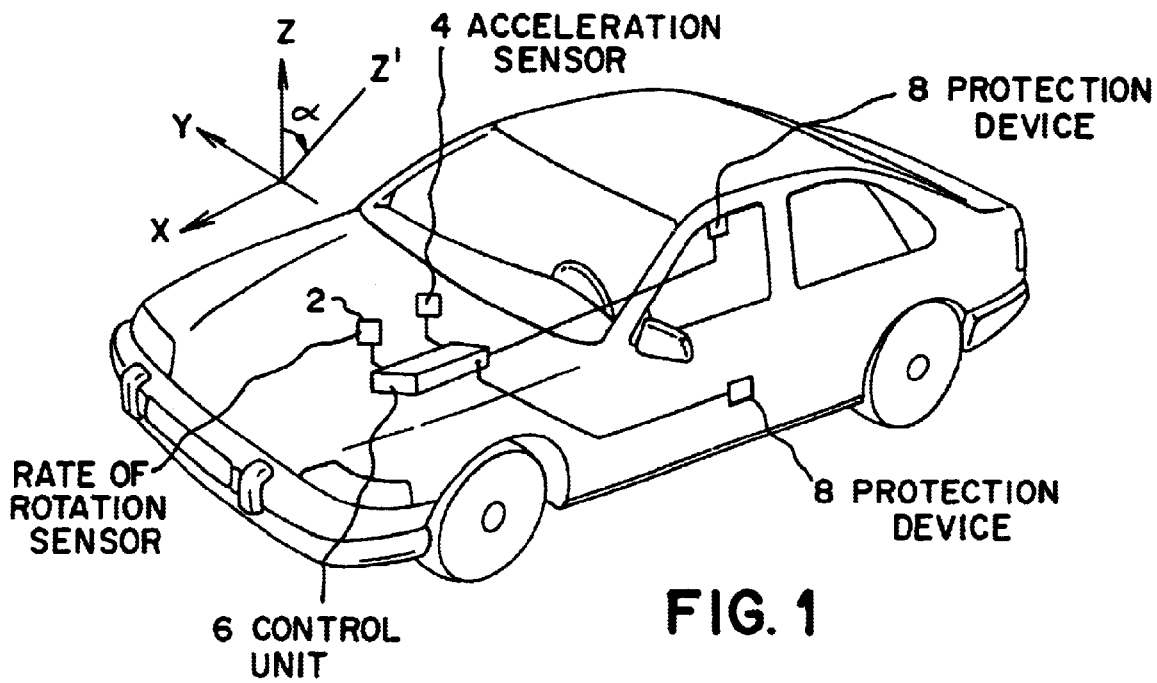
FIG. 1 shows a motor vehicle with sensors arranged therein.

Referring now to the figures of the drawing in detail and first, particularly, to FIG. 1 thereof, there is shown a motor vehicle having a rate of rotation sensor 2 and an acceleration sensor 4 that are connected to a control unit 6. The control unit 6 is connected, in turn, to occupant protection devices 8, for example, seat belt pretensioners, head airbags, or else, in particular in the case of convertibles, rollover bars that can be extended from the seat frames or body parts, etc. The efficiency of the system will be explained below in the case of a rollover in which the vehicle rotates about its longitudinal axis x. In the position z of the vertical axis of the vehicle (normal position of the vehicle on horizontal ground), the vertical axis z of the vehicle corresponds to the fixed vertical. After a rotation about the longitudinal axis by the angle $\alpha$, the vertical axis z' of the vehicle forms an angle $\alpha$ with the fixed vertical direction. The angle $\alpha$ is designated below as the absolute angle of rotation.

Figure 2:
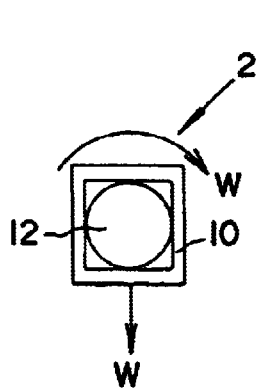
FIG. 2 illustrates the fundamental physical principle of a rate of rotation sensor.

FIG. 2 indicates the fundamental physical principle of a rate of rotation sensor: an inertial member 12, for example a ball, is located inside a housing 10. When the housing 10 connected to the motor vehicle rotates suddenly at the rate of rotation or angular velocity of $\omega$, the inertial member 12 remains at rest, and so the relative rotation between the inertial member 12 and the housing 10 can be detected and output as an output signal $\omega$ proportional to the rate of rotation, for example, in the form of pulses per time unit. A rotation by a predetermined angular amount corresponds to each pulse.

Figure 3:
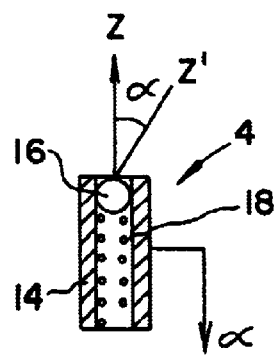
FIG. 3 illustrates the fundamental physical principle of an acceleration sensor for detecting the acceleration component that acts in the direction of the vertical axis of the object and that is a function of the absolute angle of rotation of the object.

FIG. 3 shows the fundamental principle of an acceleration sensor 4. Inside a housing 14 is arranged an inertial member 16 that is pushed upward by a spring 18 in accordance with FIG. 3. In the illustrated vertical position of the housing 14, the spring force counteracts the total acceleration due to gravity or the weight of the inertial member 16. When the housing 14 is rotated from the vertical by the angle $\alpha$, the force of the spring 18 now counteracts gravity only with a component $(m)(g)\cos\alpha$, where m is the mass of the inertial member 16, g is the end acceleration due to gravity, and $\alpha$ is the absolute angle of rotation. It is therefore possible to generate an output signal that is proportional to the absolute angle of rotation $\alpha$ by detecting the force active in the direction of the movement of the inertial member 16. By appropriately damping the moveability of the inertial member 16, the acceleration sensor 4 can be constructed in such a way that essentially only the absolute rotary position $\alpha$ is detected and accelerations of the vehicle itself that occur, for example, upon driving over obstacles, are largely suppressed. It goes without saying that such peak accelerations can also be suppressed by appropriately filtering the output signal.

Figure 4:
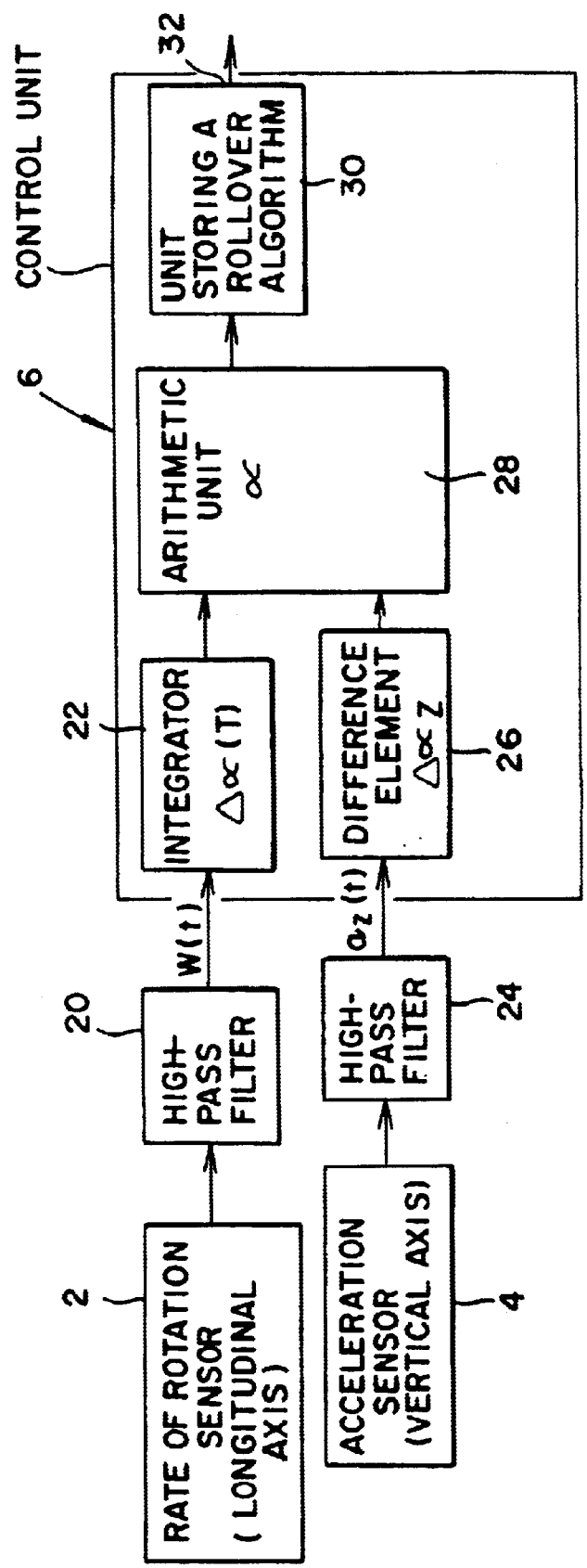
FIG. 4 shows a block diagram of an inventive device.

FIG. 4 shows a block diagram of the inventive device. The rate of rotation sensor 2 is connected to an integrator 22 via a high-pass filter 20. The acceleration sensor 4 is connected to a difference element 26 via a high pass filter 24.

The integrator 22 and the difference element 26 are connected to an arithmetic unit 28 whose output signal is fed to a unit 30 that determines whether an output signal is generated at its output 32 in order to trip appropriate occupant protection devices. This determination is made in accordance with algorithms prestored in unit 30 and by possibly evaluating further input signals. It goes without saying that a plurality of algorithms can be stored in the unit 30, and that the unit 30 can generate a plurality of output signals that can be used to individually trip individual safety devices. The safety devices can be ignited, tripped magnetically or activated in some other way.

The units 22, 26, 28 and 30 are advantageously accommodated in the control unit 6 which, if appropriate, can also hold the filters 20 and 24. Alternatively the filters 20 and 24 can also be integrated directly in the sensors 2 and 4.

The construction of the microprocessor-controlled control unit 6 is known per se and will therefore not be explained.

The functioning of the device shown in FIG. 4 will be explained below using the variables that are detected by the sensors. The further processing of these variables in conjunction with temporal control of the microprocessor (not illustrated) will also be explained:

A). The rate of rotation sensor 2 determines the time-dependent angular velocity ω(t) of the time-dependent rotation of the vehicle about its longitudinal axis. After filtering the output signal from the rate of rotation sensor 2 in the high-pass filter 20, an output signal ω(t) is available that is largely free from the zero drifting of the rate of rotation sensor 2.

Similarly, the acceleration sensor 4 generates a signal that corresponds to the absolute angle of rotation α. This signal is very inaccurate, and after being subjected to high-pass filtering, is available as a time-dependent acceleration $a_z(t)$ acting in the direction of the vertical axis of the vehicle.

B). The change in the angle of rotation is determined in the integrator 22 within the time interval T as:

$$\Delta \alpha(T) = \int_0^T \omega(t)\,dt.$$

Alternatively, the integrator 22 can count pulses sent directly from the rate of rotation sensor, during a time interval, so that a value corresponding to the angle of rotation during the time interval is available if each pulse corresponds to a predetermined angle of rotation and if counting is performed up or down depending on the direction of rotation.

The change in the acceleration component $a_z$ within the time interval T is calculated in the difference element 26 as:

$$\Delta a_z(T) = a_z(T) - a_z \qquad (0)$$

Zero fluctuations and drifting of the acceleration sensor 4 are largely compensated by this subtraction.

C). If Δα is smaller than a constant C1, or if $\Delta a_z$ is larger than a constant C2, this means that the signals are not suitable for subsequent calculation of the absolute angle of rotation, since the angular rotation was too small or the change in the acceleration component was too large, and this permits external interference to be deduced so that the system returns to the above-named stage A. If both named conditions are not fulfilled, the system goes over to the next stage D.

D). The absolute value is calculated by using the following formulas:

$$\alpha = m \cdot (\Delta a_z - \Delta a_z^0), \text{ where}$$

m=C3/Δα, $\Delta a_z^0 = 1 - \cos(\Delta \alpha)$.

The above steps are each repeated with updated data, in which offsets from the sensors are compensated. If, for example, the angle α changes by 10° and the acceleration in the Z-direction changes by 0.1 g, the absolute value of α is determined as 29.5°. The accurate calculation would yield 30°. The value, calculated using the above method, of the absolute angle of rotation α is fed to the unit 30 and is available there for further evaluation as a sufficiently accurate value of the absolute angle of rotation α that specifies the rotary position of the vehicle relative to the vertical.

The formulas named in the above steps are derived below:

As explained using FIG. 3, $a_z=(g)\cos\alpha$. It follows from this that:

$$\Delta a_z = (g)(\cos\alpha - \cos\alpha_0)$$

and $$\alpha - \alpha_0 = \Delta \alpha = \int \omega\,dt.$$

The combination of the above-named formulas yields:

$$\cos\alpha = \frac{\Delta a_z}{g} + \cos(\alpha - \Delta \alpha) \qquad (1)$$

Solving formula 1 for α yields:

$$\alpha = \pm \text{Arccos}\left[\pm \frac{1}{4 \cdot (\sin(\Delta\alpha/2))^2} \cdot \left(\pm \Delta a_z \mp \Delta a_z \cdot \cos(\Delta\alpha) + \sqrt{(2 - \Delta a_z^2 - 2\cdot\cos(\Delta\alpha))\cdot(\sin(\Delta\alpha))^2}\right)\right]$$

Figure 5:
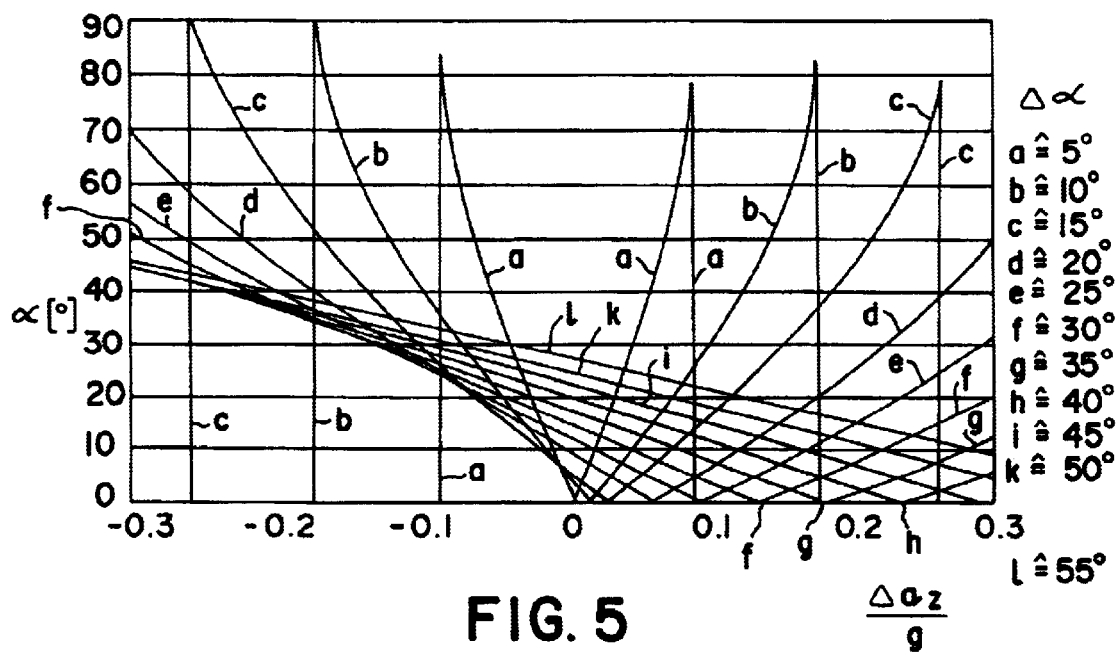
FIG. 5 shows curves for explaining the calculation of the absolute angle of rotation.

Limiting the absolute angle of rotation to the interval from −90° to +90° yields the image shown in FIG. 5.

The curves in the diagram shown in FIG. 5 show the absolute angle of rotation α as a function of $\Delta a_z/g$ for various values of Δα as parameters.

As can be seen, a linear approximation can be undertaken for $\Delta a_z$ near the zero $\Delta a_z^0$ or large values of Δα. $\Delta a_z^0$ can be calculated using formula 1 and is:

$$\Delta a_z^0 = 1 - \cos\Delta\alpha. \qquad (2)$$

(It may be pointed out that this formula can be approximated effectively by a parabola if it is impossible to calculate the cosine function because of a low arithmetic capability of the system.)

The gradient near the zero can likewise be calculated as:

$$\left.\frac{\partial \alpha}{\partial \Delta a_z}\right|_{\Delta a_z^0} = \frac{\sqrt{1 - \cos(2\cdot\Delta\alpha) + 2(\sin(\Delta\alpha))^2}}{2(\sin(\Delta\alpha))^2}$$

A good approximation is a hyperbola:

$$\left.\frac{\partial \alpha}{\partial \Delta a_z}\right|_{\Delta a_z^0} = \frac{3477 \text{ deg}^2/g}{\Delta\alpha}$$

In summary, it emerges from the above that the absolute angle of rotation α can be calculated with high accuracy and limited arithmetic capabiliy from the output signals from the two sensors 2 and 4 (FIG. 4).

Discussion of Errors;

The measurement of the input variables Δα and $\Delta_z$ can be performed only within a specific error bandwidth. For example, let the rate of rotation sensor have a tolerance band of ±5%. Moreover, even an ideal acceleration sensor for detecting accelerations in the z-direction is theoretically unable to distinguish between external accelerations and gravity. However, a distinction may be drawn by using an algorithm that, for example, monitors the stability of the acceleration signal over time, and if appropriate, correlates it with other variables. However, it is necessary to bear this source of error in mind.

Figure 6:
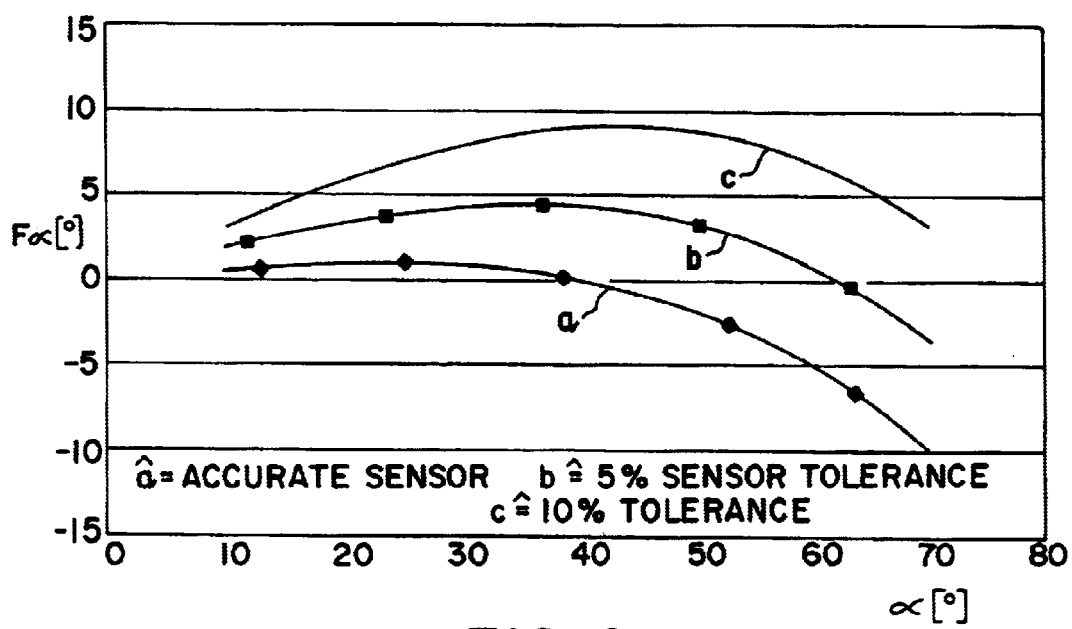
FIG. 6 shows curves for explaining the accuracy of the calculation carried out in accordance with the invention.

The curves in FIG. 6 show the error Fα in the absolute angle of rotation α in degrees as a function of the absolute angle of rotation α for various sensor tolerances. A change of 10° in the angle was assumed for the illustration. If the calculation begins with an initial absolute angle of rotation of 50° and ends with an absolute angle of rotation of 60°, the approximation in the case of perfect sensors would then lead to the result of 55° (instead of 60°). A 5% inaccuracy of the two sensors would lead to 61°, and a 10% error would lead to an absolute angle of rotation of 67°.

It goes without saying that the system described can be modified in multifarious ways. For example, the acceleration sensor fixed in the vehicle can also be aligned in a way other than parallel to the vertical axis of the vehicle.

We claim:

1. A method for determining an absolute rotational angle of an object that is rotating about an approximately horizontal rotational axis, the method which comprises:
   determining a change in a rotational angle of the object occurring during a time interval;
   determining an acceleration component acting in a direction of a vertical axis of the object;
   determining a change, occurring during the time interval, in the acceleration component acting in the direction of the vertical axis of the object; and
   calculating the absolute rotational angle of the object from the change in the rotational angle and the change in the acceleration component acting in the direction of the vertical axis of the object.

2. The method according to claim 1, wherein: the object is a motor vehicle rotating about a longitudinal axis thereof.

3. The method according to claim 1, which comprises calculating the absolute rotational angle using the following formula:

$$\alpha = (m)(\Delta a_z - \Delta a_z^0),$$

where $\alpha$ is the absolute rotational angle, and
where $m = C3/\Delta\alpha$, $\Delta a_z^0 = 1 - \cos(\Delta\alpha)$, C3 is a constant, $\Delta\alpha$ is the change in the rotational angle, and $\Delta a_z$ is the change in the acceleration component.

4. A device for determining an absolute angle of rotation of an object that is rotating about an approximately horizontal rotational axis, the device comprising:
   a rate of rotation sensor for detecting an angular velocity of the object rotating about the rotational axis;
   an integrator for integrating the angular velocity and for determining a change in an angle of rotation;
   an acceleration sensor for detecting an acceleration component acting in a direction of a vertical axis of the object;
   a difference element for determining a change, accompanying the change in the angle of rotation, in the acceleration component acting in the direction of the vertical axis; and
   an arithmetic unit for calculating the absolute angle of rotation of the object from the change in the angle of rotation and the change in the acceleration component.

5. The device according to claim 4, comprising: a high-pass filter configured between said rate of rotation sensor and said integrator.

6. The device according to claim 4, comprising:
   a high-pass filter configured between said acceleration sensor and said difference element.

7. The device according to claim 4, wherein said arithmetic unit operates using the following formula:

$$\alpha = (m)(\Delta a_z - \Delta a_z^0),$$

where $\alpha$ is the absolute rotational angle, and
where $m = C3/\Delta\alpha$, $\Delta a_z^0 = 1 - \cos(\Delta\alpha)$, C3 is a constant, $\Delta\alpha$ is the change in the rotational angle, and $\Delta a_z$ is the change in the acceleration component.

8. The device according to claim 7, wherein said arithmetic unit is programmed to perform the following steps:
   A) detect $\omega(t)$ and $a_z(t)$, where t=time, $\omega(t)$ is the angular velocity, and $a_z(t)$ is the acceleration component;
   B) determine $$\Delta\alpha(T) = \int_0^T \omega(t)\,dt,$$

where T=a time interval, and calculate $\Delta a_z = a_z(T) - a_z(0)$;
   C1) if $\Delta\alpha < C1$, where C1 is a constant, then proceed to step A),
   C2) if $\Delta a_z > C2$, where C2 is a constant, then proceed to step A; and
   D) calculate:

$$\alpha = m \cdot (\Delta a_z - \Delta a_z^0), \text{ where}$$

$m = C3/\Delta\alpha$, $\Delta a_z^0 = 1 - \cos(\Delta\alpha)$
and C3 is a constant.

9. The device according to claim 4, in combination with the object, wherein the object is a motor vehicle rotating about a longitudinal axis thereof.

* * * * *